US012249271B2

(12) United States Patent
Hu et al.

(10) Patent No.: US 12,249,271 B2
(45) Date of Patent: Mar. 11, 2025

(54) ENHANCED OVERDRIVE OR UNDERDRIVE FOR FLAT PANEL DISPLAYS

(71) Applicant: Apple Inc., Cupertino, CA (US)

(72) Inventors: Jenny Hu, Santa Clara, CA (US); Alexandre V Gauthier, Santa Clara, CA (US); Tao Jia, Ningbo (CN); Scott R Johnston, San Francisco, CA (US); Yingying Tang, Sunnyvale, CA (US); Chaohao Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/358,004

(22) Filed: Jul. 24, 2023

(65) Prior Publication Data

US 2024/0071295 A1 Feb. 29, 2024

Related U.S. Application Data

(60) Provisional application No. 63/400,347, filed on Aug. 23, 2022.

(51) Int. Cl.
*G09G 3/32* (2016.01)
*G09G 3/20* (2006.01)

(52) U.S. Cl.
CPC ............. *G09G 3/32* (2013.01); *G09G 3/2007* (2013.01); *G09G 2310/08* (2013.01); *G09G 2320/0252* (2013.01); *G09G 2320/0295* (2013.01); *G09G 2320/045* (2013.01); *G09G 2340/16* (2013.01); *G09G 2360/16* (2013.01); *G09G 2360/18* (2013.01)

(58) Field of Classification Search
CPC ...... G09G 3/32; G09G 3/3648; G09G 3/2007; G09G 2310/08; G09G 2320/048; G09G 2320/0295; G09G 2320/0252; G09G 2320/045; G09G 2340/16; G09G 2360/16; G09G 2360/18
USPC .................................................... 345/691, 98
See application file for complete search history.

(56) References Cited

U.S. PATENT DOCUMENTS

| | | | | |
|---|---|---|---|---|
| 10,657,874 | B2 | 5/2020 | Tang et al. | |
| 10,706,817 | B2 | 7/2020 | Tang et al. | |
| 10,891,897 | B2 | 1/2021 | Xu et al. | |
| 10,997,898 | B2 | 5/2021 | Wang et al. | |
| 2016/0335965 | A1 | 11/2016 | Huang et al. | |
| 2018/0005598 | A1 | 1/2018 | Kambhatla et al. | |
| 2020/0005716 | A1* | 1/2020 | Tan | G09G 3/3291 |
| 2020/0118486 | A1* | 4/2020 | Lin | G09G 3/3233 |
| 2023/0055288 | A1* | 2/2023 | Lee | G09G 5/022 |

* cited by examiner

*Primary Examiner* — Jimmy H Nguyen
(74) *Attorney, Agent, or Firm* — Fletcher Yoder, P.C.

(57) ABSTRACT

Devices and methods are provided to overdrive or underdrive a display panel to account for display pixel hysteresis due to several frames of pixel history. An electronic device may include an electronic display and processing circuitry. The electronic display includes a number of display pixels. The processing circuitry may generate image data for the display pixels. The processing circuitry may receive a current frame value of the image data targeted for a first display pixel and, based at least in part on the current frame value and a pixel history of the first display pixel—may indicate a gray level for a number of previous frames—generate a compensated value by which to drive the first pixel to overcome pixel hysteresis to reach the desired luminance at an initial response.

22 Claims, 11 Drawing Sheets

ENHANCED OVERDRIVE OR UNDERDRIVE FOR FLAT PANEL DISPLAYS

CROSS-REFERENCE TO RELATED APPLICATION

This application claims priority to U.S. Patent Application No. 63/400,347, filed on Aug. 23, 2022, titled "Enhanced Overdrive or Underdrive for Flat Panel Displays," which is hereby incorporated by reference in its entirety for all purposes.

SUMMARY

The present disclosure relates generally to display panels and, more specifically, to devices and methods to overdrive or underdrive a display panel to account for display pixel hysteresis due to several frames of pixel history.

Many electronic devices may use display panels to show content to users. Many display panels may use light-emitting diode (LED) panels (e.g., organic light-emitting diodes (OLED) panels, micro-OLED panels, micro-LED (μ-LED) panels), liquid crystal display (LCD) and/or plasma panels. In many devices, such as televisions, smartphones, computer panels, smartwatches, among others, displays may be employed to show content and/or provide a user interface. For example, image content displayed may include one or more frames. A first frame may include first image content, while a subsequent frame may include second image content that may differ from the first image content. In some instances, the initial response of the display to being programmed to display the second image content may not completely correspond to the second image content. Instead, the display may appear from the perspective of a viewer to be brighter or darker than desired. This may be due to display pixel hysteresis, which refers to the tendency of a display pixel to behave differently based on the image data previously programmed into the display pixel. For example, the first image content may include lower brightness levels in comparison to the second content. The history of programming the display pixel with the darker first image content may cause the display pixel not to fully reach the brightness level specified by the second image content.

Moreover, multiple past frames of history may further affect display pixel behavior. For example, when a display pixel may be programmed not to emit light (e.g., programmed to display black, gray level G0) for multiple frames of image data, the display pixel may have a greater display pixel hysteresis. When subsequently programmed with a non-G0 value after multiple frames of G0 data, the display pixel may appear darker than the non-G0 value. In addition, some display technologies may be more sensitive to gray levels other than G0. Depending on the exact display technology, the dependency upon pixel history could vary with which gray levels make the hysteresis worse and how many frames it is sensitive to.

The initial response of the display panel may be improved by tracking pixel history over multiple frames and adjusting the image data used to program the display panel accordingly. For example, the system may track some number of previous frames in which a display pixel was programmed to overdrive or underdrive the image data to cause the display pixels to display certain gray levels (e.g., a target gray level of the image data). In particular, the display pixel may be programmed to display a gray level (Gx) for some number of frames. The number of previous frames of Gx (e.g., pixel history) may be used to adjust image data when the display pixel is subsequently programmed with new image data. For example, the image data may be adjusted to overdrive or underdrive the display pixel stronger when there are more recent previous frames of G0. This may overcome the effects of display pixel hysteresis even beyond multiple frames. In addition, in some examples, the multiple frames of display pixel history may be stored efficiently in a single frame buffer. To do this, the recent history for each pixel of the display panel may be encoded into a form that may have the same or a substantially similar size as pixel data.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
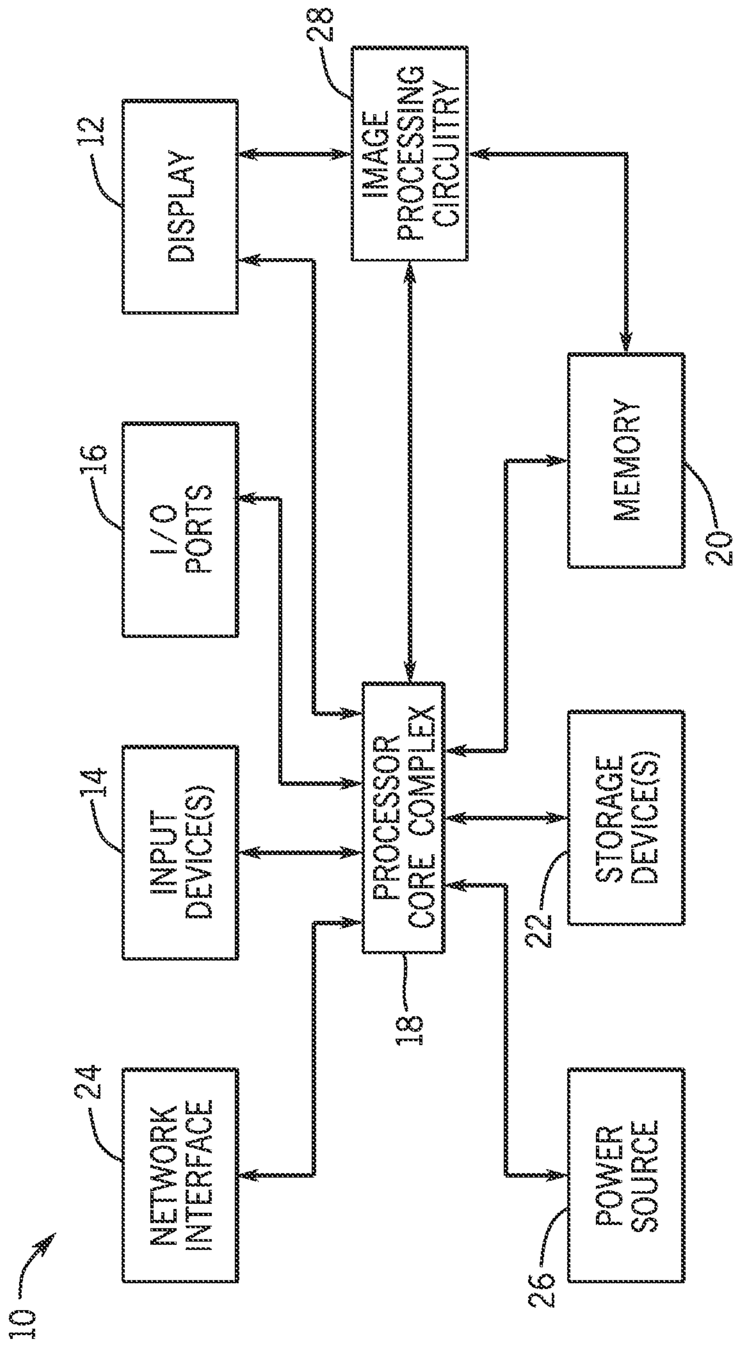
FIG. 1 is a schematic block diagram of an electronic device, in accordance with an embodiment.

A general description of suitable electronic devices that may employ an overdrive to provide an improved response to changed display settings is described herein. Keeping the foregoing in mind, an electronic device 10 including an electronic display 12 (e.g., display device) is shown in FIG. 1. As is described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

The electronic display 12 may be any suitable electronic display. For example, the electronic display 12 may include a self-emissive pixel array having an array of one or more self-emissive pixels. The electronic display 12 may include any suitable circuitry to drive the self-emissive pixels, including for example row driver and/or column drivers (e.g., display drivers). Each of the self-emissive pixels may include any suitable light-emitting element, such as a LED, one example of which is an OLED. However, any other suitable type of pixel, including non-self-emissive pixels (e.g., liquid crystal as used in liquid crystal displays (LCDs), digital micro-mirror devices (DMD) used in DMD displays) may be used.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, a power source 26 (e.g., power supply), and image processing circuitry 28. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. The image processing circuitry 28 (e.g., a graphics processing unit) may be included in the processor core complex 18.

The processor core complex 18 may execute instructions stored in local memory 20 and/or the main memory storage device 22 to perform operations, such as generating and/or transmitting image data. As such, the processor core complex 18 may include one or more general purpose microprocessors, one or more application specific integrated circuits (ASICs), one or more field programmable logic arrays (FPGAs), or any combination thereof.

In addition to instructions, the local memory 20 and/or the main memory storage device 22 may store data to be processed by the processor core complex 18. Thus, the local memory 20 and/or the main memory storage device 22 may include one or more tangible, non-transitory, computer-readable mediums. For example, the local memory 20 may include random access memory (RAM) and the main memory storage device 22 may include read-only memory (ROM), rewritable non-volatile memory such as flash memory, hard drives, optical discs, and/or the like.

The network interface 24 may communicate data with another electronic device and/or a network. For example, the network interface 24 (e.g., a radio frequency system) may enable the electronic device 10 to communicatively couple to a personal area network (PAN), such as a Bluetooth network, a local area network (LAN), such as a 1622.11x Wi-Fi network, and/or a wide area network (WAN), such as a 4G, Long-Term Evolution (LTE), or 5G cellular network.

The power source 26 may provide electrical power to one or more components in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter.

The I/O ports 16 may enable the electronic device 10 to interface with other electronic devices. For example, when a portable storage device is connected, the I/O port 16 may enable the processor core complex 18 to communicate data with the portable storage device. The input devices 14 may enable user interaction with the electronic device 10, for example, by receiving user inputs via a button, a keyboard, a mouse, a trackpad, and/or the like. The input device 14 may include touch-sensing components in the electronic display 12. The touch-sensing components may receive user inputs by detecting the occurrence and/or the position of an object touching the surface of the electronic display 12.

In addition to enabling user inputs, the electronic display 12 may include one or more display panels. Each display panel may be a separate display device or one or more display panels may be combined into the same device. The electronic display 12 may control light emission from the display pixels to present visual representations of information, such as a graphical user interface (GUI) of an operating system, an application interface, a still image, or video content, by displaying frames based on corresponding image data. As depicted, the electronic display 12 is operably coupled to the processor core complex 18 and the image processing circuitry 28. In this manner, the electronic display 12 may display frames based on image data generated by the processor core complex 18 and/or the image processing circuitry 28. Additionally or alternatively, the electronic display 12 may display frames based on image data received via the network interface 24, an input device 14, an I/O port 16, or the like.

Figure 2:
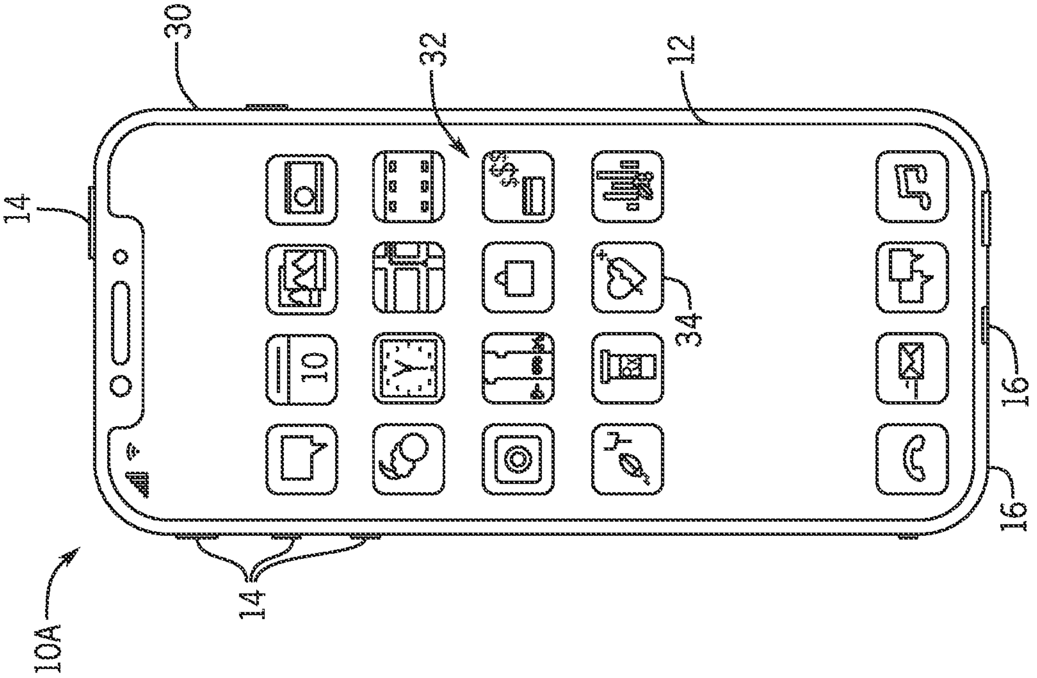
FIG. 2 is a front view of a hand-held device representing an embodiment of the electronic device of FIG. 1, in accordance with an embodiment.

As described above, the electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A includes an enclosure 30 (e.g., housing). The enclosure 30 may protect interior components from physical damage and/or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 may be accessed through openings in the enclosure 30 and may include, for example, an audio jack to connect to external devices.

Figure 3:
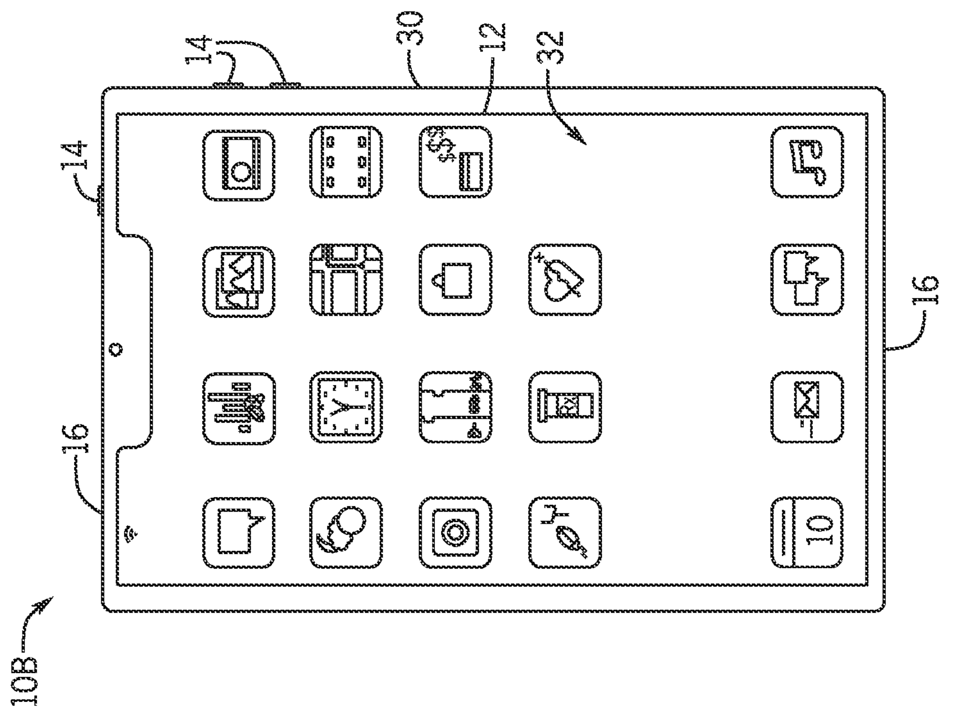
FIG. 3 is a front view of another hand-held device representing another embodiment of the electronic device of FIG. 1, in accordance with an embodiment.
Figure 4:
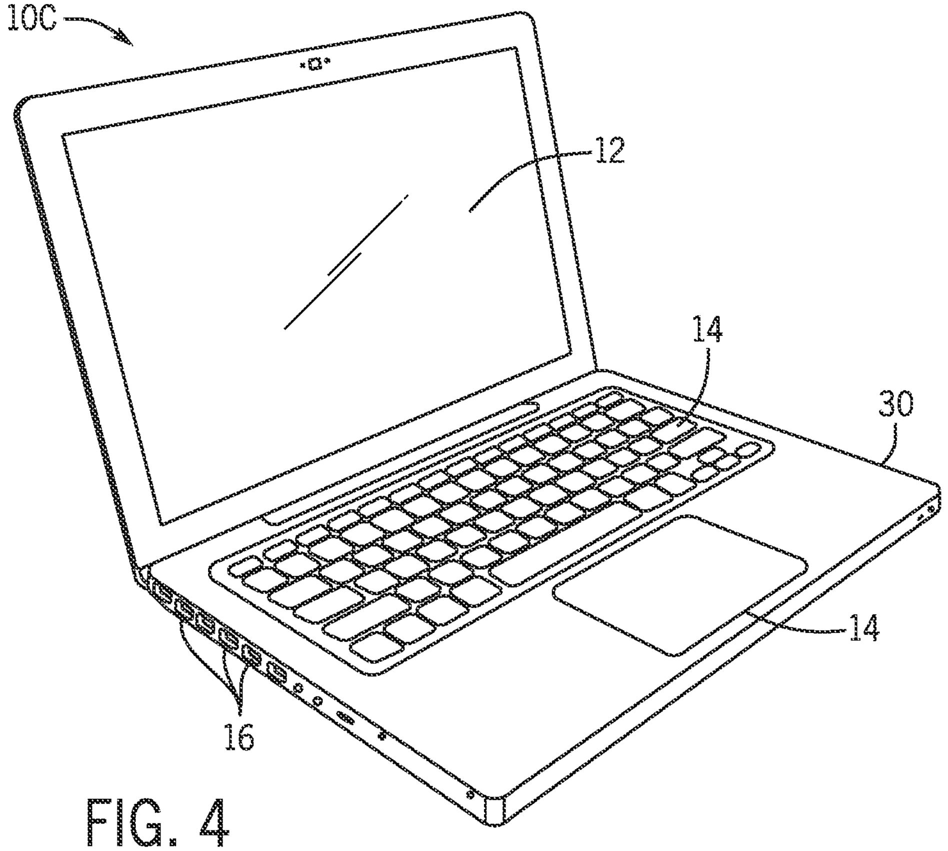
FIG. 4 is a perspective view of a notebook computer representing an embodiment of the electronic device of FIG. 1, in accordance with an embodiment.
Figure 5:
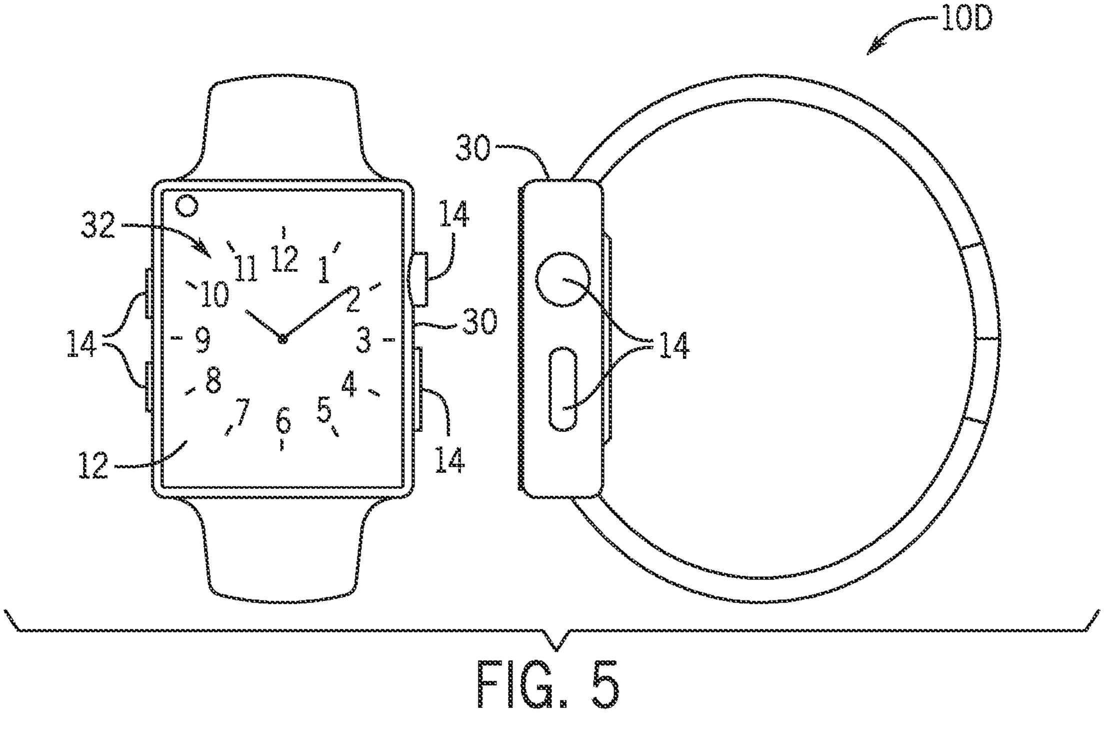
FIG. 5 is a front view and side view of a wearable electronic device representing another embodiment of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
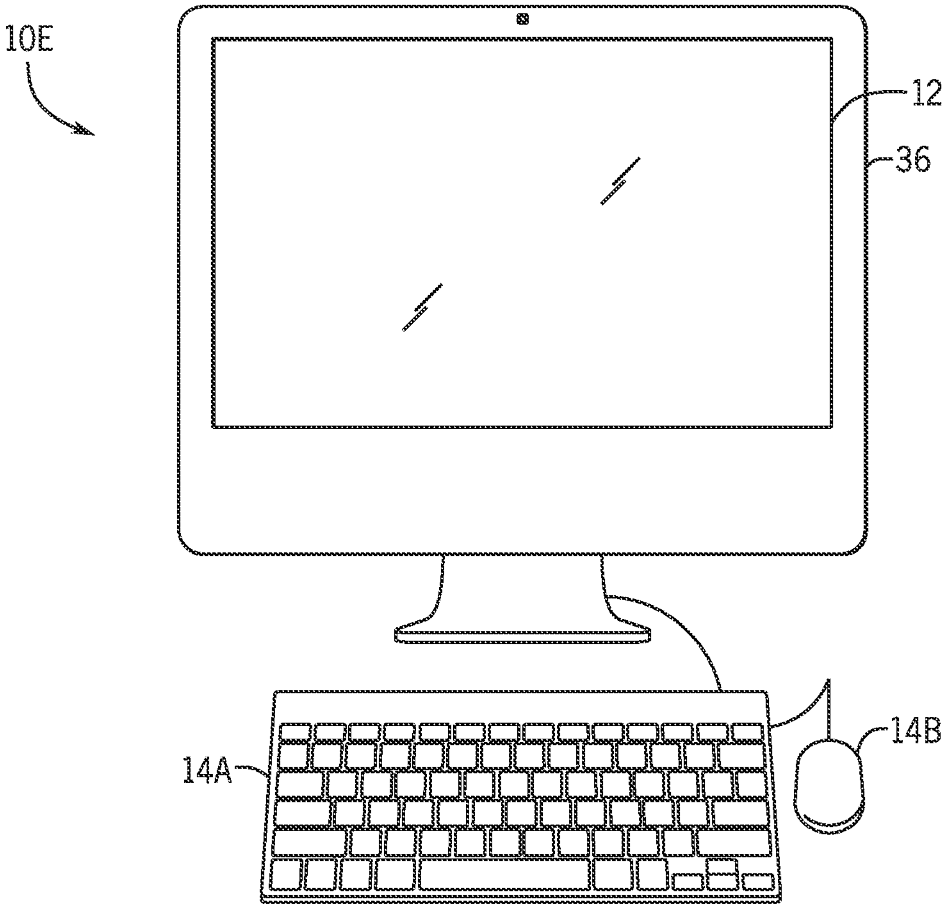
FIG. 6 is a front view of a desktop computer representing another embodiment of the electronic device of FIG. 1, in accordance with an embodiment.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar devices by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input devices 14, such as the keyboard 14A or mouse 14B (e.g., input devices 14), which may connect to the computer 10E.

Figure 7:
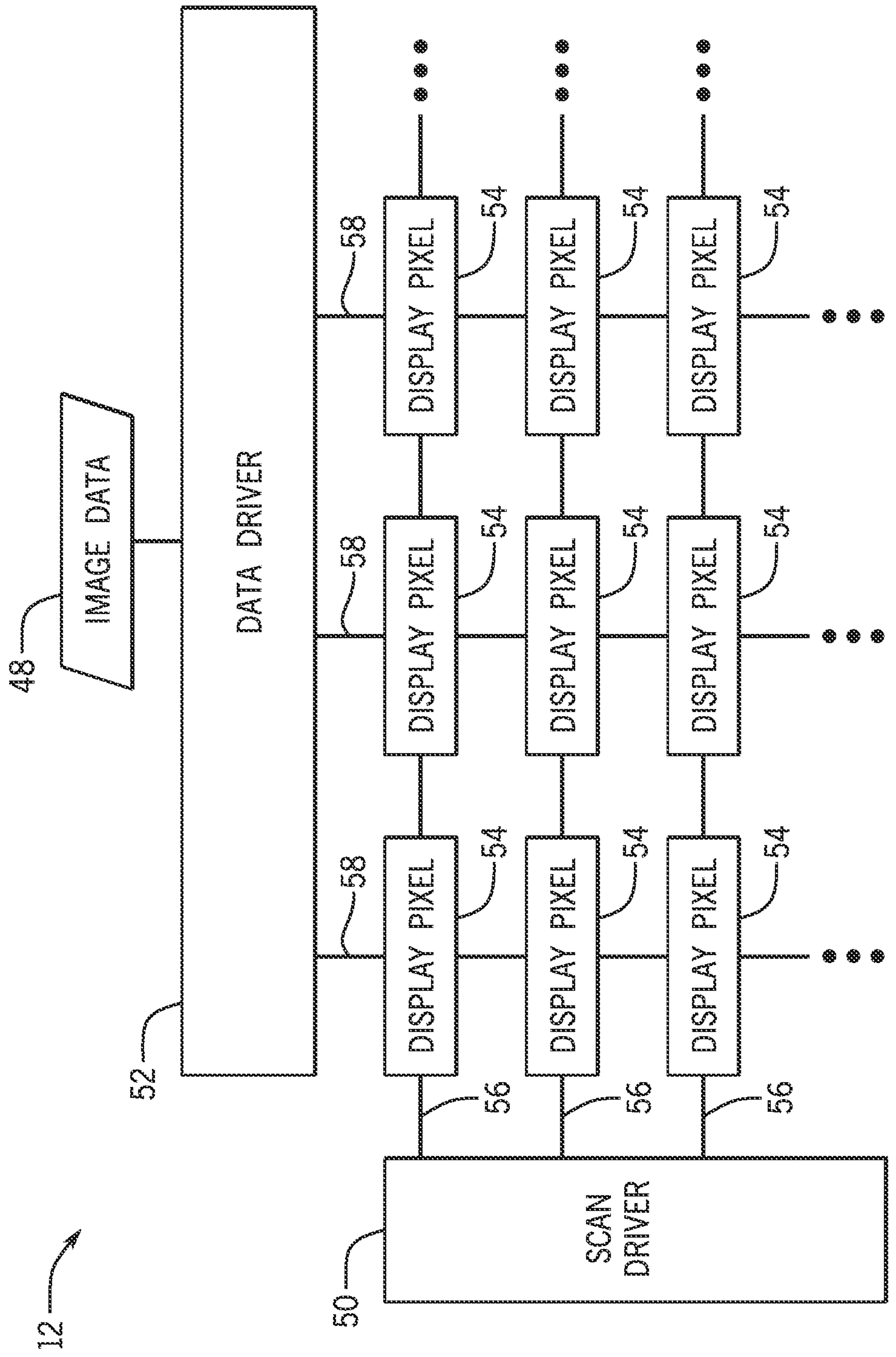
FIG. 7 is a block diagram of an electronic display, in accordance with an embodiment.

With the foregoing in mind, FIG. 7 illustrates the electronic display 12 receiving image data 48 to display image content (e.g., a frame of image content). The electronic display 12 includes scan driver circuitry 50 and data driver circuitry 52 to program the image data 48 onto display pixels 54. The display pixels 54 may each contain one or more self-emissive elements, such as a light-emitting diodes (LEDs) (e.g., organic light-emitting diodes (OLEDs) or micro-LEDs (μLEDs)). Different display pixels 54 may emit different colors. For example, some of the display pixels 54 may emit red light, some of the display pixels 54 may emit green light, and some of the display pixels 54 may emit blue light. Thus, the display pixels 54 may be driven to emit light at different brightness levels (e.g., gray levels) to cause a user viewing the electronic display 12 to perceive an image formed from different colors of light. The display pixels 54 may also correspond to hue and/or luminance levels of a color to be emitted and/or to alternative color combinations, such as combinations that use cyan (C), magenta (M), and yellow (Y), or any other suitable color combinations.

The scan driver 50 may provide scan signals (e.g., pixel reset, data enable, on-bias stress) on any suitable number of scan lines 56 per pixel row to control the display pixels 54 by row. For example, the scan driver 50 may cause a row of the display pixels 54 to become enabled to receive a portion of the image data 48 from data lines 58 from the data driver 52. In this way, an image frame of image data 48 may be programmed onto the display pixels 54 row by row. Other examples of the electronic display 12 may program the display pixels 54 in groups other than by row.

Before continuing, several terms that will be used in this disclosure will be described. From one image frame to another, the settings of display pixels 54 may change as the images displayed on the electronic display 12 change. Thus, there may be a transition as a display pixel 54 switches from emitting a first amount of light for a first image frame to emitting a second amount of light for a second image frame. Thus, in displaying the first image frame, the electronic display 12 may program the display pixel 54 with pre-transition settings to achieve a first target gray level of light emission from the display pixel 54. In displaying the second image frame, the electronic display 12 may program the display pixel 54 with post-transition settings to achieve a second target gray level of light emission from the display pixel 54. In certain instances, the display pixel 54 may have been previously programmed with a first gray level (Gx) for one or more image frames. Because the initial response of the display pixel 54 after the transition from the first gray level of a first image frame to a target gray level of a second image frame could be different (e.g., higher or lower) than the target gray level, the post-transition settings with which the display pixel 54 may be programmed may include compensated settings to drive the initial response of the display pixel 54 to the desired post-transition settings (e.g., gray level). These compensated settings may be higher or lower than the target gray level but, due to hysteresis of the display pixel 54, may cause the display pixel to emit light corresponding to the target gray level.

Figure 8:
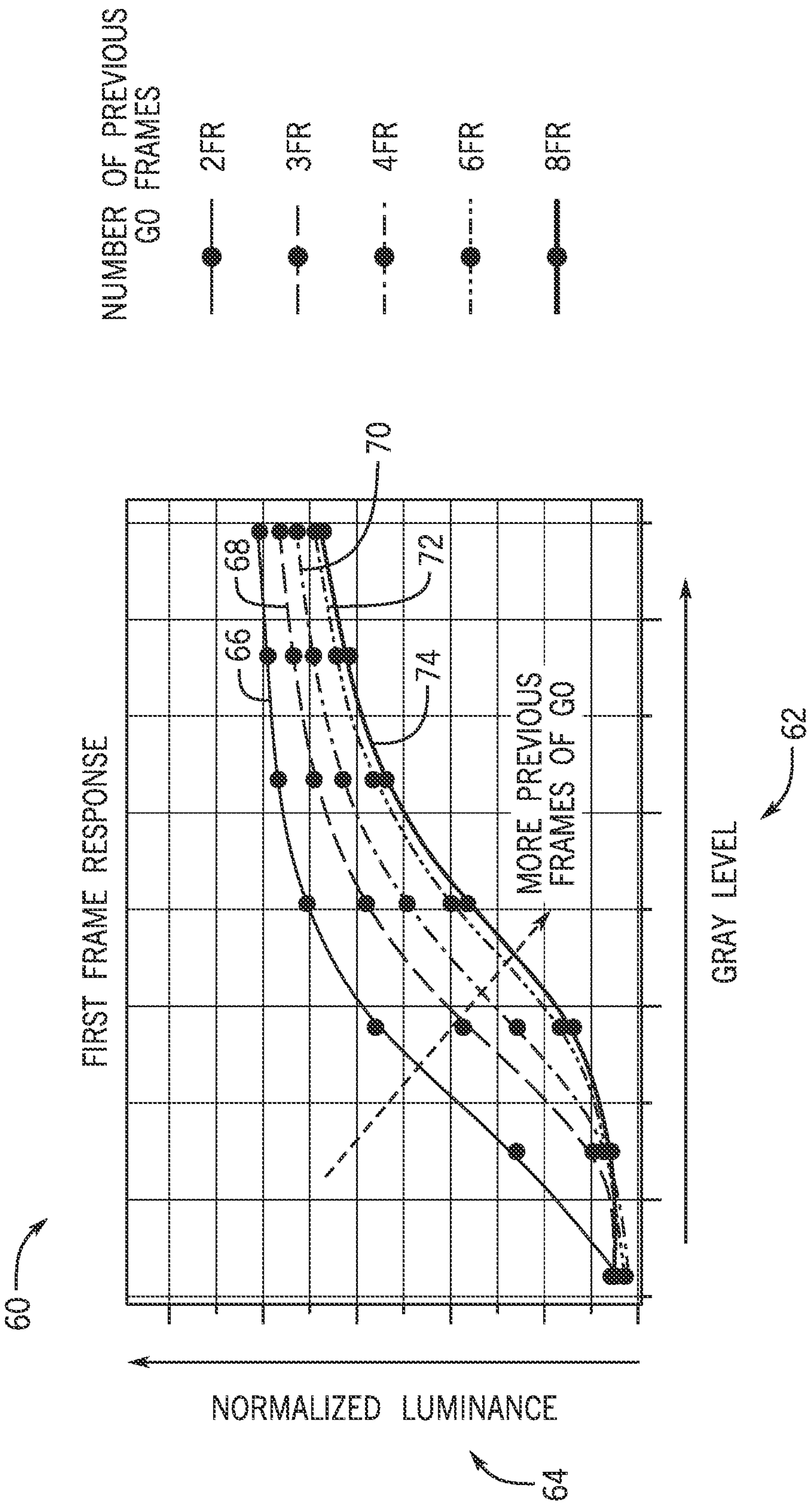
FIG. 8 is a graph illustrating a first frame response at a gray level and a luminance value, in accordance with an embodiment.
Figure 9:
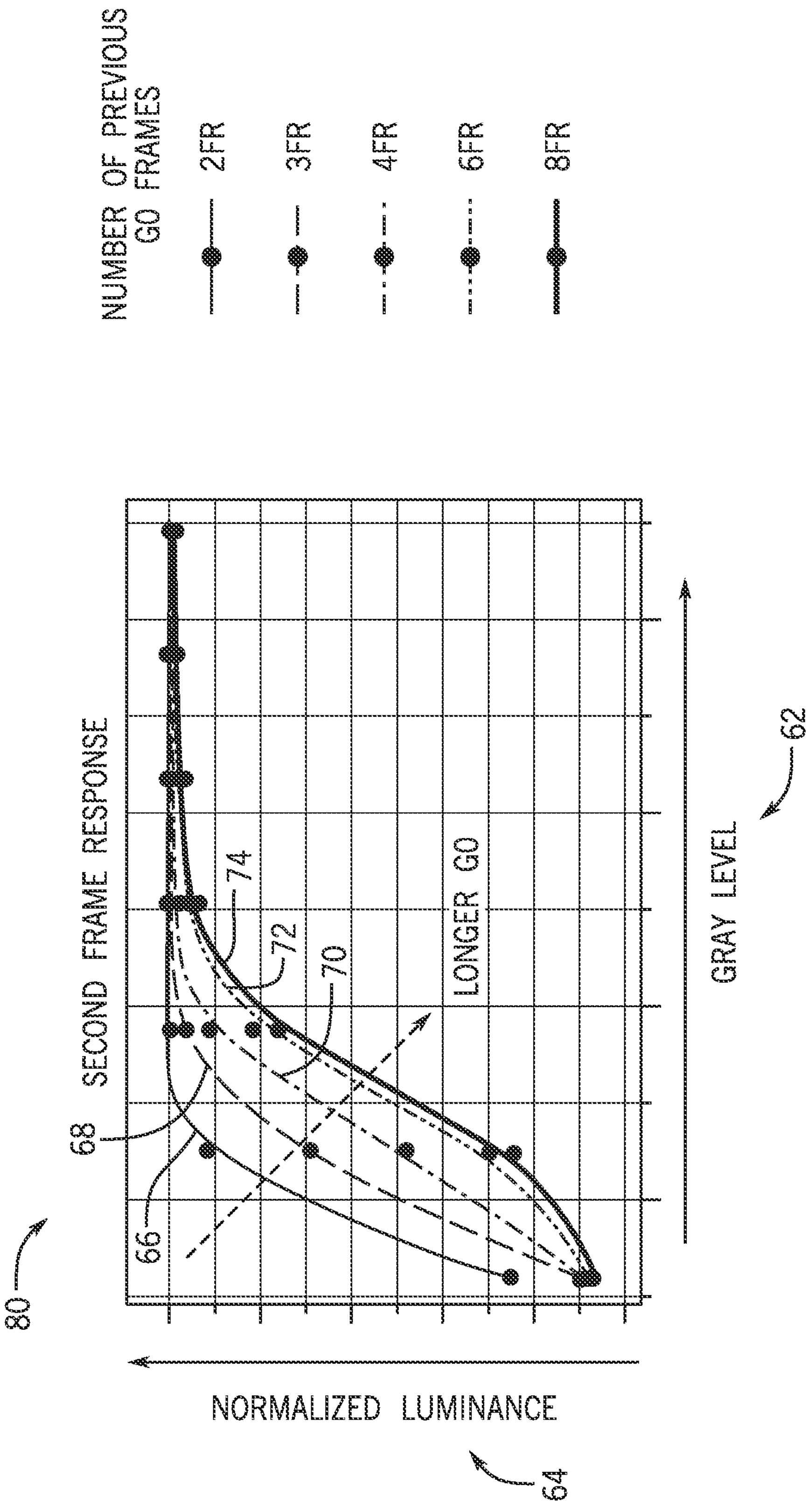
FIG. 9 is a graph illustrating a second frame response at a gray level and a luminance value, in accordance with an embodiment.

In certain instances, the display pixel 54 may have been previously programmed with gray level 0 (G0) (black) for two or more image frames. After many frames of G0, without compensated settings, the initial response (e.g., light emission) of the display pixel 54 post-transition to a second image frame may be different from the target gray level of the second image frame. Indeed, it may take multiple image frames before the target gray level may be reached. As shown by FIGS. 8 and 9, a display pixel may react differently for different gray levels and for different G0 histories. FIG. 8 illustrates a graph 60 depicting an optical response of a display pixel 54 at a gray level 62 with a normalized luminance value 64 for a first frame of image content. The gray level 62 may correspond to a desired target luminance of a display pixel 54 (e.g., as provided in the image data 48). The normalized luminance value 64 represents a ratio of the luminance value of the display pixel 54 for a first frame to the target luminance. For example, the normalized luminance 64 may be 1.0 when the display pixel 54 displays a luminance corresponding to the post-transition settings. However, as discussed herein, in some instances when display pixels 54 change from one setting to another (e.g., a change in color), the image content displayed by some of the display pixels 54 may initially differ from settings at which the content should be displayed (e.g., post-transition settings, luminance value 64). Specifically, when the pre-transition settings include one or more previous frames of G0, the first frame response (FFR) at a desired gray level 62 may not reach a desired luminance value 64 (e.g., due to hysteresis of components of the electronic display 12, such as the pixels 54 or the driver integrated circuit (DIC) of the electronic display 12).

For example, as illustrated, the initial optical response may be a first frame response (FFR) at a gray level 62 from pre-transition settings (e.g., a number of previous G0 frames) to the post-transition settings (e.g., the relative luminance 64). The graph 60 illustrates five examples corresponding to lines 66, 68, 70, 72, and 74 corresponding to an increasing G0 history. For example, a first line 66 corresponds to two previous frames of G0, a second line 68 corresponds to three previous frames of G0, a third line 70 corresponds to four previous frames of G0, a fourth line 72 corresponds to six previous frames of G0, and a fifth line 74 corresponds to eight previous frames of G0. As the number of previous frames of G0 increases, the initial optical response of the display pixel 54 to the target brightness of the first frame may decrease or degrade, as seen by a decreasing normalized luminance value 64 from the first line 66 to a fifth line 74. For example, if there are two previous frames of G0 (as illustrated by the first line 66), the FFR at gray level 100 (G100) may display 0.6 normalized luminance 64, or only 60% of the desired luminance. If there are three previous frames of G0 (as illustrated by second line 68), the FFR at G100 may have 40% of the desired luminance, if there are four previous frames of G0 (as illustrated by the third line 70), the FFR may have 30% of the desired luminance if there are six previous frames of G0 (as illustrated by the fourth line 72), the FFR may have 18% of the desired luminance if there are eight previous frames of G0 (as illustrated by the fifth line 74), the FFR may have 15% of the desired luminance, and so forth. In another example, as illustrated in graph 60, if there are two previous frames of G0 (the first line 66), the FFR at G150 may have 80% of the desired luminance, if there are three previous frames of G0 (the second line 68), the FFR may have 75% of the desired luminance if there are four previous frames of G0 (the third line 70), the FFR may have 71% of the desired luminance if there are six previous frames of G0 (the fourth line 72), the FFR may have 69% of the desired luminance, and if there are eight previous frames G0 (the fifth line 74), the FFR may 67% of the desired luminance. Accordingly, as the number of previous frames of G0 increases, the FFR to a non-zero gray level may display a smaller percentage of the desired luminance. In other words, the display pixels 54 may have a slower response time (e.g., time, subsequent frames) to reach the desired luminance following one or more previous frames of G0. Furthermore, not only does the first frame include a slower response time when increasing luminance, subsequent frames may also include a slower response time.

As another example of this phenomenon, FIG. 9 illustrates a graph 80 depicting the initial optical response for a second frame for a gray level 62 with a normalized luminance value 64. The normalized luminance value 64 may be a ratio of the luminance value of the second frame to the target luminance (e.g., based on image data 48). The graph 80 also illustrates five examples corresponding to lines 66, 68, 70, 72, and 74 corresponding to an increase in G0 history. The first line 66 corresponds to two previous frames of G0, the second line 68 corresponds to three previous frames of G0, the third line 70 corresponds to four previous frames of G0, the fourth line 72 corresponds to six previous frames of G0, and the fifth line 74 corresponds to eight previous frames of G0. As seen from the graph 80, the normalized luminance 64 of the second frame response (SFR) may also depend on the number of previous frames of G0. In some instances, a trend of the SFR may be the same as or similar to the trend for the FFR. For example, if there are two previous frames of G0, the SFR may have, relatively, a quickest response to reach the post-transition value (e.g., normalized luminance value of 1.0, 100% of the desired luminance), while the SFR after eight previous frames of G0 may, relatively, have the slowest response time to reach the luminance value of 1.0.

As illustrated in the graph 80, if there are two previous frames of G0 (line 66), the SFR at G100 after two frames of black history 42 may display a 1.0 normalized luminance, or 100% of the desired luminance. Further, if there are four previous frames of G0, the SFR may display 90% of the desired luminance, if there are six previous frames of G0, the SFR may display 80% of the desired luminance, if there are eight previous frames of G0, the SFR may display 75% of the desired luminance Although the SFR may be closer to the desired luminance compared to the FFR of FIG. 8, the SFR may still include overcompensated or undercompensated luminance values (e.g., luminance values different from the target luminance). As such, the SFR may not be properly displaying the post-transition settings. Accordingly, an overdrive technique may be desired to modify one or more subsequent frames of image content such that the luminance values of the subsequent frames (e.g., FFR, SFR, third frame response, fourth frame response, and so on) more closely correspond to the post-transition settings. In some instances, the one or more frames of gray levels may be saved in a multi-frame buffer to form a pixel history of the display pixel 54 and/or the display 12.

While the illustrated examples described with respect to FIGS. 8 and 9 contain two, three, four, six, and eight previous frames of G0, increasing numbers of frames of G0 may further impact the FFR and/or the SFR. Indeed, the general trend of a slower response as the number of previous G0 increases may continue. For example, an FFR following eight or more previous frames of G0 may have a slower (e.g., worse) response compared to an FFR following eight or less frames of G0. Furthermore, the normalized luminance values associated with the gray levels shown in FIGS. 8 and 9 are merely illustrative. Indeed, the normalized luminance values may change based on the type of electronic device, a type of the display, and/or properties of the display pixels or display drivers, or the like. While FIGS. 8 and 9 illustrate the initial optical response following different G0 history, the trend may pertain to pixel histories with different gray levels. For example, as the number of previous frames of low gray levels increase, the display pixels may have a slower response time to reach the desired luminance at a higher gray level. As such, it may be beneficial to apply an overdrive technique to modify one or more subsequent frames of image content. Similarly, following a number of previous frames of higher gray levels, the display pixels may have a slower response time to reach a desired luminance at a lower gray level. As such, an underdrive technique may be used in some circumstances to modify one or more subsequent frames of image content.

Figure 10:
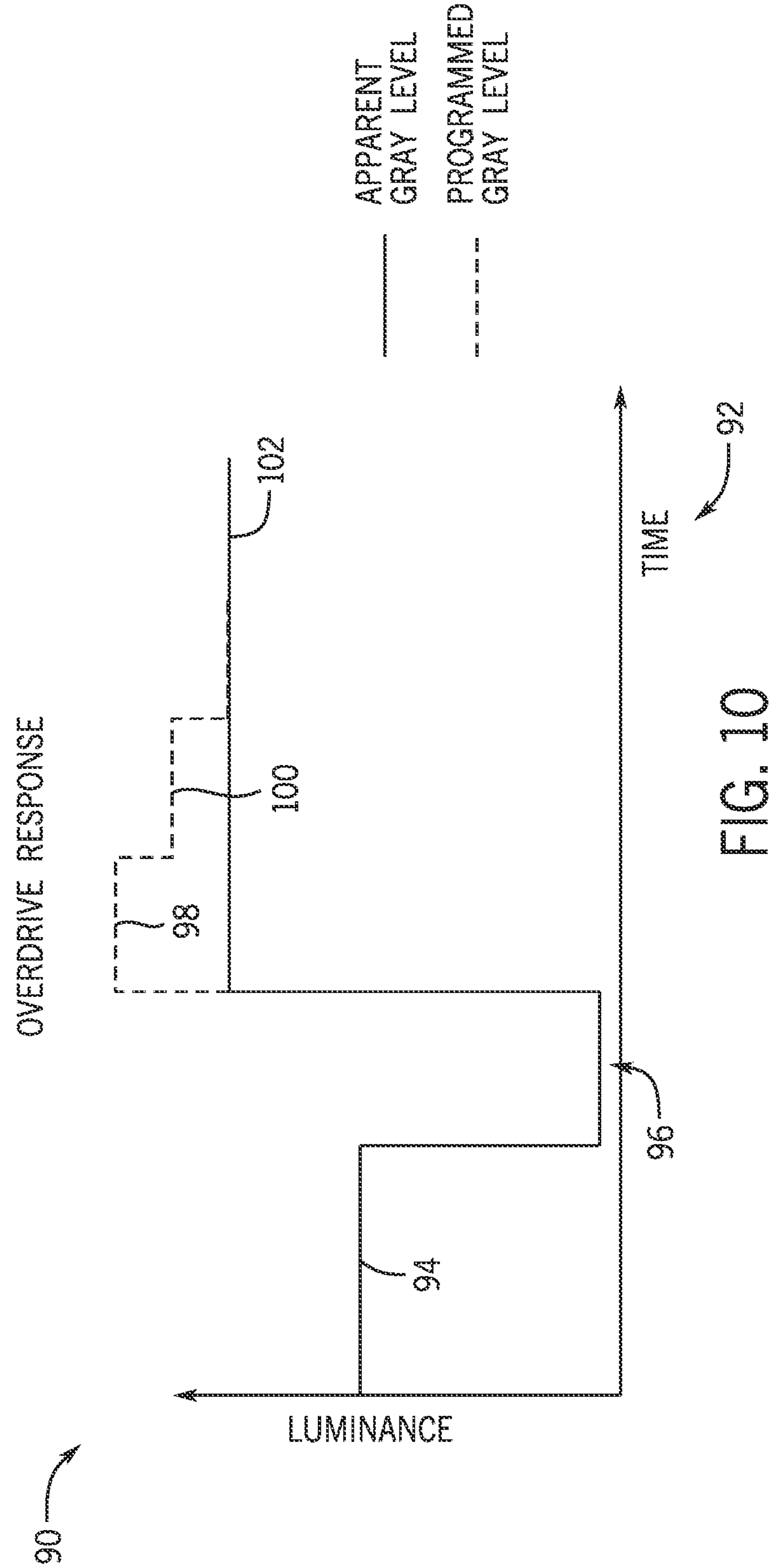
FIG. 10 is a graph illustrating an initial response over time of a transition following a frame of gray level zero, in accordance with an embodiment.
Figure 11:
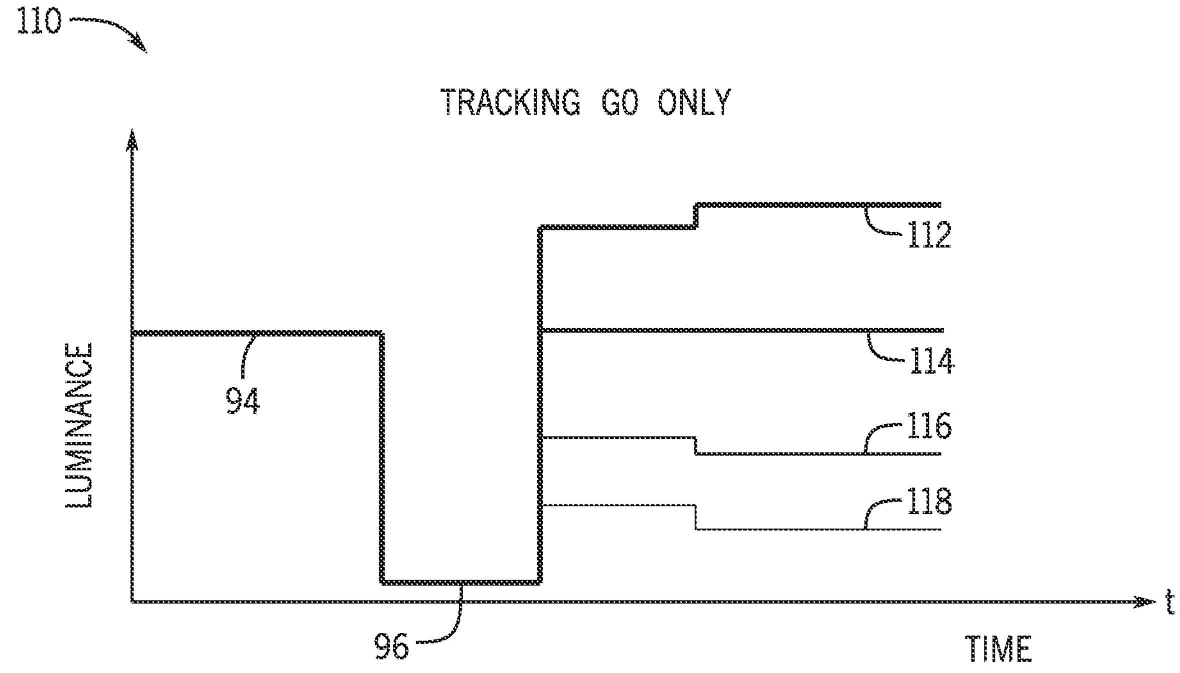
FIG. 11 is a graph illustrating an initial response over time of a transition following a frame of gray level zero with overdrive compensation tracking a single frame of pixel history, in accordance with an embodiment.
Figure 12:
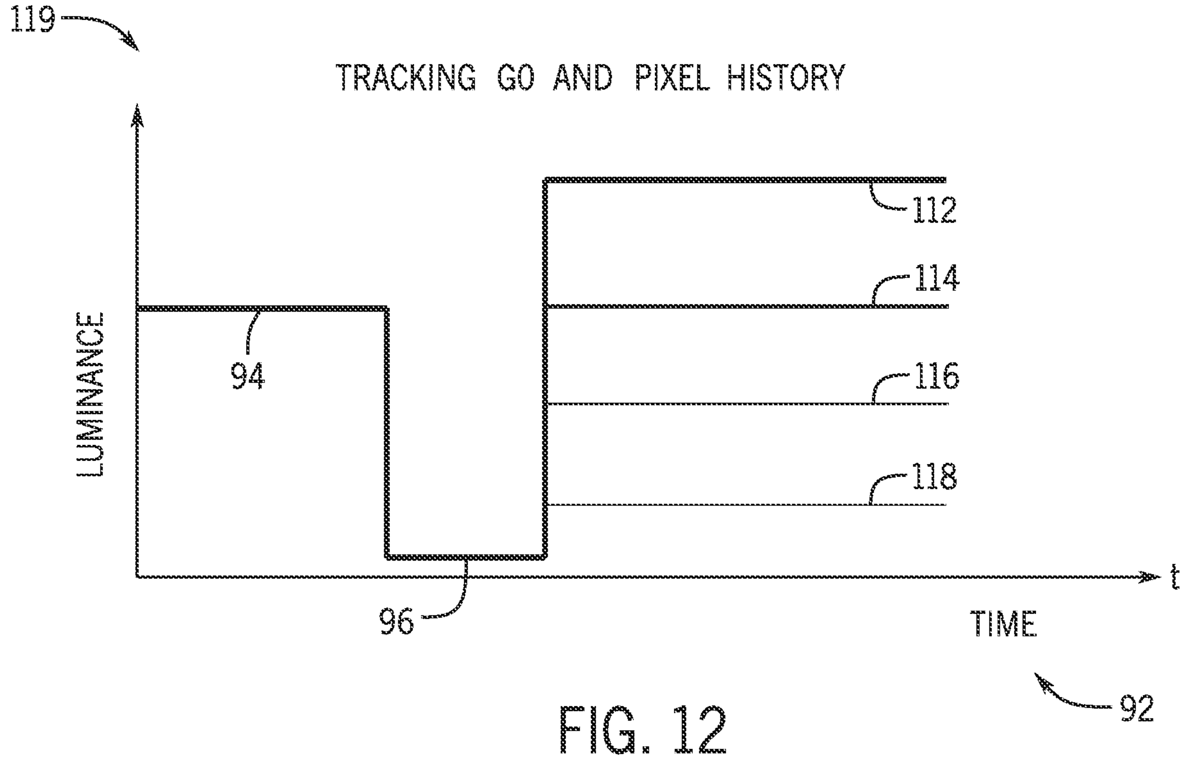
FIG. 12 is a graph illustrating the initial response over a time of a transition following a frame of gray level zero with overdrive compensation tracking multiple frames of pixel history, in accordance with an embodiment.

Keeping the foregoing in mind, FIGS. 10, 11, and 12 are provided to illustrate how the overdrive or underdrive technique may be performed by any suitable image processing circuitry (e.g., image processing circuitry 28 or the processor core complex 18 of FIG. 1) to modify the initial response of a display pixel 54.

For example, as shown by FIG. 10, an overdrive technique may be applied to the image data to overcome display pixel hysteresis that would prevent the correct amount of light from being emitted. Overdriving (or underdriving) the display pixel 54 may involve programming the display pixel 54 with a signal having a gray level value higher than (or lower than) the target gray level to overcome the hysteresis effects of the display pixel 55. Thus, it may be said that the compensated settings are higher than the target gray level when overdriven or lower than the target gray level when underdriven, but the amount of light emitted by the display pixel 54 may equal to that which would be emitted at the target gray level without hysteresis.

With the foregoing in mind, FIG. 10 illustrates a graph 90 depicting an initial response of the display pixel 54 transitioning to G200 after several frames at G150 and several frames of G0 over time 92. Gray level refers to brightness settings of the display pixels 54 and is determined based on the image data. The time 92 includes a number of image frames. In this case, overdriving the display pixel 54 may improve the initial optical response of the display pixel 54 given the recent history of programming the display pixel 54.

With the foregoing in mind, the graph 90 depicts the display pixel 54 at a gray level 150 (G150) for some number of frames over a first period of time (as illustrated by line 94). For example, the display pixel 54 may display image content at G150 for three frames. Then, the display pixel 54 may display one or more frames of G0 (as illustrated by line 96), such as one frame of G0. The pixel history (e.g., three frames of G150 and one frame of G0) may be tracked in memory by any suitable data processing circuitry (e.g., image processing circuitry 28, the processor core complex 18, a display driver). Additionally or alternatively, the G0 history (e.g., the number of frames of G0 before a transition to a non-G0 frame) may also be tracked for image data compensation. That is, the image data may be compensated based on the pixel history to cause the display pixel 54 to display the target luminance. For example, the display pixel 54 may be driven to a higher gray level (as illustrated by lines 98 and 100) in order to display the desired target luminance at the initial response (as illustrated by line 102). For example, in order for the display pixel 54 to display G200 following one frame of G0, the display pixel 54 may be driven to G255 (as illustrated by line 98). Then, the display pixel 54 may be driven to G225 (as illustrated by line 100) in order for the display pixel 54 to continue displaying G200 at a second frame following the frame of G0. Then, the display pixel 54 may reach static luminance (as illustrated by line 102), meaning that the display pixel 54 may be driven at G200 to display G200. In this way, compensating the image data with compensation settings may be used to drive the display pixels 54 to reach a desired initial response.

FIG. 11 illustrates a graph 110 depicting an initial response of the display pixel 54 at a gray level over a period of time 92 with the overdrive system tracking one frame of pixel history. For example, a display pixel 54 may display content at the gray level G63 for a period of time, then display content at G0 for one or more frames before transitioning to display content at a non-zero gray level. When only G0 history may be tracked, the image data may be overcompensated or undercompensated. As illustrated, the graph 110 illustrates the display pixel 54 at a gray level G63 for a period of time (as illustrated by line 94). For example, the display pixel 54 may display G63 for three frames. Then, the display pixel 54 may display G0 for a period of time (as illustrated by line 96), such as one or more frames. The display pixel 54 may then transition to a non-zero gray level value for one or more frames.

The graph 110 illustrates the display pixel 54 transitioning to four different gray levels based on compensated image data that may be compensated based only on tracking G0 history (e.g., one G0 frame of history). For example, the graph 110 illustrates a first line 112 corresponding to the display pixel 54 transitioning to G200. In some instances, the overdrive compensation may not be adequate for an initial response at a gray level greater than the gray level of previous frames (e.g., frames of G63). In other words, by only tracking a single frame of G0, the compensated image data may be undercompensated and the display pixel 54 may not display the target luminance. The transition may be undercompensated for a period of time (e.g., one frame, two frames, three frames,) before reaching the target gray level or target luminance. After the period of time, the display pixel 54 may display static luminance, as shown by the straight, flat portion of line 112.

In another example, a second line 114 may correspond to the display pixel 54 transitioning to G63 following the frame of G0. Since the display pixel 54 previously displayed G63 prior to displaying the frame of G0, relying on the history of a single frame of G0 may result in image data being accurately compensated for the transition. As illustrated by the second line 114, the display pixel 54 may immediately reach the target luminance (e.g., at the FFR).

In another example, the compensated image data may be overcompensated following the frame of G0 if the pixel history may not be not taken into account. The graph 110 illustrates a third line 116 corresponding to the display pixel 54 transitioning to G26 following the frame of G0 and a fourth line 118 corresponding to the display pixel 54 transitioning to G16 following the frame of G0. The third line 116 depicts the display pixel 54 being overcompensated for a period of time (e.g., one frame, two frames, three frames) before reaching the target luminance. However, the fourth line 118 displays more overcompensation than the third line 116. For example, the gray level associated with the fourth line 118 may be less than the gray level associated with the third line 116. For example, when the display pixel 54 may be transitioning to a lower gray level, the display pixel 54 may receive additional overcompensation for the PPR before reaching static luminance due to a higher previous gray level, such as displaying G63.

Accordingly, in some cases, the pixel history may include multiple frames of previous gray levels and/or the number of frames of G0. For example, it may be beneficial to track not only one historical gray level (Gx) but also track other historical gray levels (e.g., Gy and Gz) to apply the appropriate overdrive or underdrive compensation to the image data. The compensation for the initial response may be determined by a current frame value (e.g., target gray level of the image data, a target luminance) and a pixel history (e.g., one or more previous frame values). As such, the desired luminance may be achieved at the initial response. With the foregoing in mind, FIG. 12 illustrates a graph 119 depicting the initial response of the display pixel 54 after a transition of G0 with the overdrive system tracking multiple frames of the pixel history. The initial response illustrated in FIG. 12 may be improved as compared to the initial response illustrated in FIG. 11, since multiple frames of pixel history (e.g., previous frame values, G0 history) may be tracked and image data may be compensated for the pixel history. For example, the display pixel 54 may display a non-zero gray level for a period of time 82, then display G0 for a subsequent period of time, then display another non-zero gray level. The period (e.g., frames) of non-zero gray levels may be saved as part of the pixel history. For example, the pixel history may include four frames of G63 followed by a frame of G0. The overdrive system may provide compensated image data to the display pixel based on the pixel history such that the display pixel 54 may reach the target luminance immediately.

For example, the graph 119 depicts a first line 112 which may correspond to the display pixel 54 transitioning to G200, a second line 114 which may correspond to the display pixel 54 transitioning to G62, a third line 116 which may correspond to the display pixel 54 transitioning to G26, and a fourth line 118 which may correspond to the display pixel 54 transitioning to G16. By taking into account the pixel history, the image data may be compensated by an amount of compensation to cause the initial response of the display pixel 54 to match the target luminance. For example, the display pixel 54 may receive the compensated image data and transition to G200 after one frame of G0. As illustrated in the first line 112, the compensated image data may drive the display pixel to G210 in order for the display pixel to reach G200 immediately. As shown in the second line 114, the display pixel 54 may immediately reach the desired luminance of one or more previous frames. Still, in another example, the display pixel 54 may be underdriven to G20 or G14 to reach G26 (as illustrated by the third line 116) and G16 (as illustrated by the fourth line 118), respectively, immediately following a transition from G0. While the illustrated example tracks the G0 history and previous gray levels, the pixel history may also include a refresh rate, a temperature, or a global display brightness value (DBV).

Figure 13:
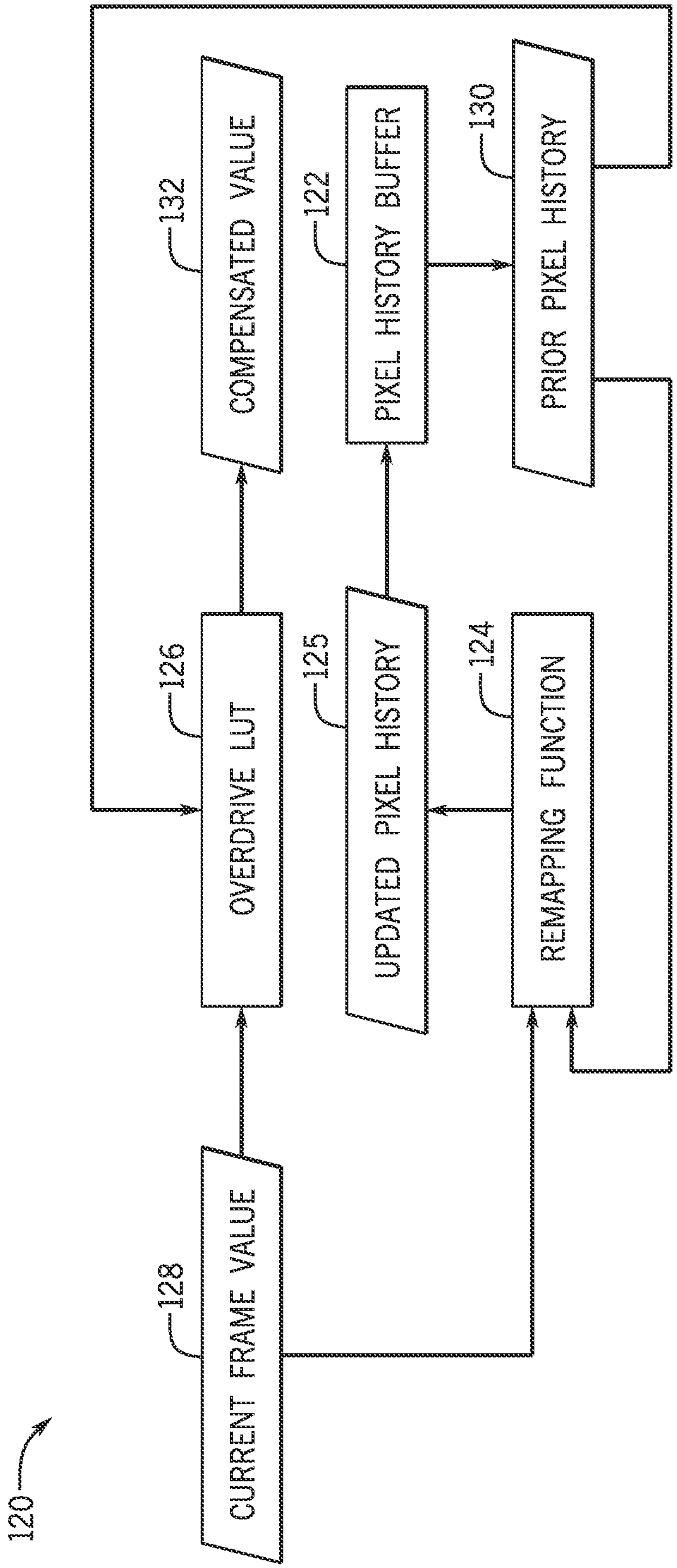
FIG. 13 is a block diagram of an overdrive system, in accordance with an embodiment.
Figure 14:
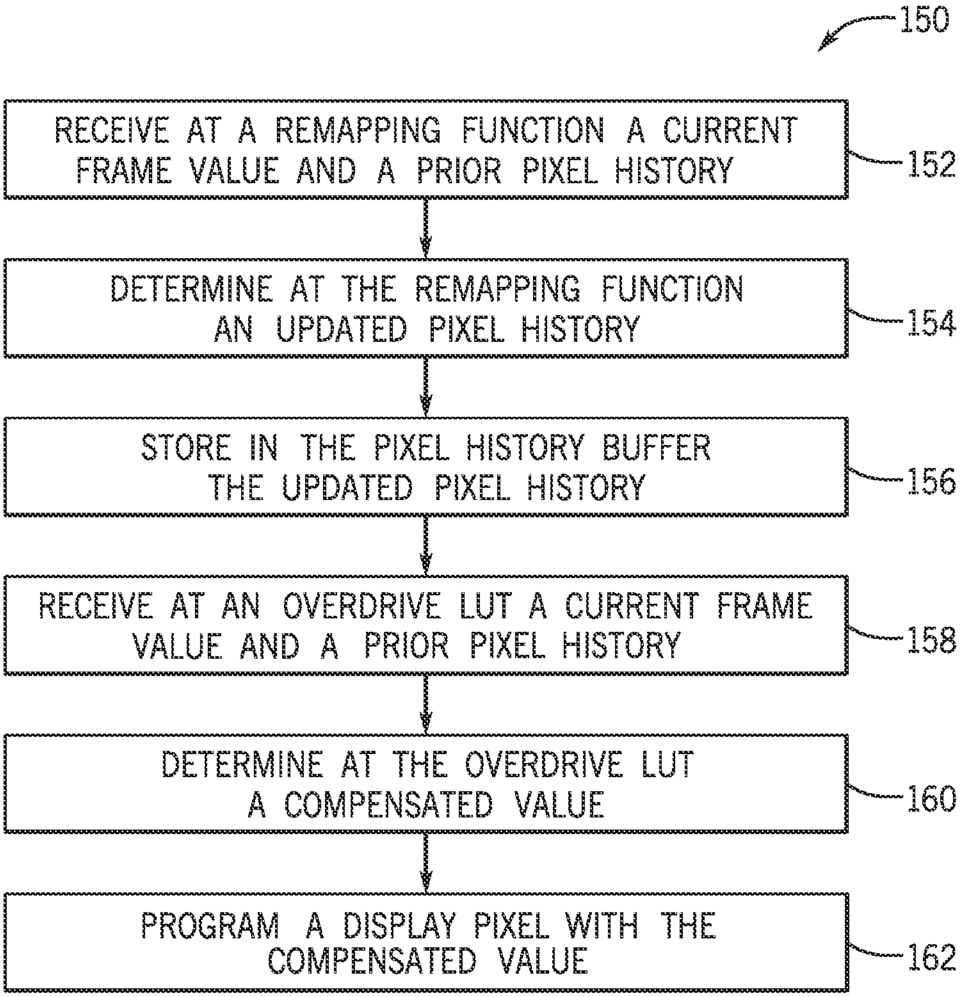
FIG. 14 is a flow chart of a method for adjusting image data for one or more frames of content using an overdrive system, in accordance with an embodiment.

FIG. 13 is a block diagram of an overdrive system 120. FIG. 14 is a flow chart of an example method 150 for implementing the overdrive system 120. Although referred to as an overdrive system, the overdrive system 120 may perform overdrive or underdrive when appropriate for a given pixel history. The overdrive system 120 may be a hardware block within the image processing circuitry 28, the processor core complex 18, or the display driver of the electronic display 12, or may be implemented in software running on any suitable processing circuitry (e.g., the image processing circuitry 28, the processor core complex 18, or a processor of the display driver), or any combination of these. Furthermore, while the method 150 describes steps in a certain order, it should be noted that the method 150 may be performed in an order that differs from the order described below. For clarity, FIGS. 13 and 14 will be discussed together.

The system 120 may include a pixel history buffer 122, a remapping function 124 (e.g., a pixel modification lookup table, circuitry), and an overdrive lookup table (LUT) 126. The system 120 may receive a current frame value 128. Although not shown, the current frame value 128 may be bit-shifted to match a bit depth of the system 120, which may allow the system 120 to be more efficient by using a lower number of bits than the current frame value 128. The overdrive LUT 126 may use the current frame value 128 (representing a desired pixel value to appear on the electronic display 12) and a pixel history 130 (representing some number of frames of recent pixel history) to generate a compensated value 132. Although also not shown, the compensated value 132 may be bit-shifted back to the bit depth of the current frame value 128 if previously bit-shifted to a lower bit-depth. When a display pixel 54 of the electronic display 12 is driven using the compensated value 132 (e.g., an overdriven or underdriven value), the display pixel 54 may emit light corresponding to the current frame value 128 despite its recent pixel history. For example, if the prior pixel history 130 indicates that the display pixel 54 displayed four consecutive frames of G0, the overdrive LUT 126 may define the compensated value 132 to be higher than if the prior pixel history 130 indicated that the display pixel 54 displayed two consecutive frames of G0.

The remapping function 124 may generate an updated pixel history 125 based on the current frame value 128 and the prior pixel history 130. The pixel history buffer 122 may store the updated pixel history 125 for use in a subsequent frame. In some examples, the updated pixel history 125 may be compressed before being stored and decompressed to output the pixel history 130 using any suitable compression technique. The updated pixel history 125 and the pixel history 130 thus may represent recent pixel history over any suitable number of frames of pixel history (e.g., as mentioned with respect to FIG. 10 or 12). In certain instances, the pixel history buffer 122 may be a single frame buffer storing one frame of image data, where each pixel value of the pixel history buffer 122 encodes information about one or more historical frames of pixel data corresponding to that display pixel 54, such as multiple previous frames of G0 for a respective display pixel 54. The remapping function 124 may encode at least part of the recent pixel history to produce an updated pixel history 125. The updated pixel history 125 may be stored in the pixel history buffer 122. The updated pixel history 125 may have a size equal to a pixel, greater than a pixel, or smaller than a pixel, and may encode recent pixel history using one or more indices that define a gray level and/or one or more dummy indices representing G0 history.

In an example, the remapping function 124 may use a number of indices of a lookup table to store the updated pixel history 125. For example, the lookup table may include 256 indices, 512 indices, 1024 indices, 2048 indices, 4096 indices, or any suitable number of indices for storing the updated pixel history 125. In an example, the current frame value 128 may be a 10-bit value and the pixel history buffer 122 may track 10-bit values (e.g., current frame value 128, updated pixel history 125). The pixel history buffer 122 may store an updated pixel history 125 that includes 1024 indices corresponding to certain historical gray levels. The first 256 indices may correspond to 8-bit gray levels 0 through 255, while the remaining indices correspond to the other pixel history (e.g., pre-defined pixel history comprising information from multiple frames). To convert the 10-bit current frame value 128 into the 8-bit 0-255 range, a bit-shifting function can be used as part of the remapping function 124. In the single frame tracking mode, the bit-shift could make up the entire remapping function 124.

In another example in which the pixel history buffer 122 tracks 8-bit values, the pixel history buffer 122 may store an updated pixel history 125 that includes 256 indices that may correspond to certain historical gray levels. For example, the 256 indices may correspond to gray levels 0 through 255. Additionally or alternatively, the updated pixel history 125 of the pixel history buffer 122 may compress the indices such that some smaller number of indices corresponds to gray levels (e.g., indices 0 to 250 may correspond to gray levels 0 through 255), while the remaining indices may correspond to other pixel history that may cover more than one previous frame of pixel history (e.g., indices 251 through 256 may correspond to dummy indices representing the gray level values of one or more prior frames, though any other suitable encoding scheme may be used). In this way, the pixel history buffer 122 may store the display pixel values of one or more previous frames by storing an updated pixel history 125 that encodes past pixel history into a single frame. The illustrated examples of the remapping function 124 are intended to illustrate how the remapping function may work, however, any suitable mode of operation (e.g., function) may be used to remap the recent pixel history to generate the updated pixel history 125. With the foregoing in mind, at block 152 of the flowchart 150 of FIG. 14, the remapping function 124 may receive a current frame value 128 for a display pixel 54 and a prior pixel history 130 corresponding to a pixel history from the previous frame and/or other prior frames. The current frame value 128 corresponds to a target display pixel value (e.g., target luminance) for a display pixel 54 within a current image frame for display on the electronic display 12. The prior pixel history 130 corresponds to the updated pixel history 125 corresponding to the previous image frame stored in the pixel history buffer 122.

At block 154, the remapping function 124 determines and outputs an updated pixel history 125. For example, by applying the remapping function 124, the overdrive system 120 may use the current frame value 128 of the display pixel 54 and the prior pixel history 130 to determine the updated pixel history 125. The remapping function 124 may include any suitable modes of operation. For example, the remapping function 124 may include a single frame tracking mode, a full pixel history tracking mode, and a second frame response (SFR) mode. Based on the current frame value 128 and the pixel history 130, a mode of the remapping function 124 may be used to determine the updated pixel history 125. In effect, the new updated pixel history 125 incorporates the current frame value 128 into the pixel history encoded in the updated pixel history 125. Consider, for example, that the pixel history 125 is in the same range as the current frame value 128. In this case, the remapping function 124 may be understood to generate the updated pixel history 125 in the single frame tracking mode. In the single frame tracking mode, the pixel history 130 may be equivalent to the prior frame value. By way of example, if the current frame value 128 is a gray level of 1024, and the value of the pixel history 130 is between 0 and 2047, the updated pixel history 125 may be output as the current frame value 128 of 1024. Thus, for the next image frame, the pixel history 130 will be the current frame value 128.

In certain instances, the pixel history 125 may not be in the same range as the current frame value 128. For example, the current frame value 128 includes high gray level values while the pixel history 125 includes many consecutive frames of low gray levels, or vice versa. To account for significant display pixel hysteresis, the remapping function 124 may utilize the full pixel history tracking mode or the SFR mode. These modes may be particularly useful when the pixel history includes one or more frames of G0, but may also be used when non-zero gray levels are tracked. In certain instances, the pixel history 130 may represent a bit-shifted value that is in a range beyond that of the current frame value 128.

By way of example, it may be beneficial to track the number of consecutive frames that the current frame value 128 is G0. Thus, when the pixel history 130 is G0 (meaning that the one previous current frame value 128 was G0) and the current frame value 128 is also G0, the remapping function 124 may output the updated pixel history 125 including two frames of G0. By way of example, the pixel history 130 may indicate a pixel history of a frame of G50 followed by the two frames of G0. The pixel history buffer 122 may be a two-position frame buffer containing the number of G0 frames since the most recent non-G0 frame. A first position may contain the most recent non-zero gray level and the second position may contain the number of consecutive G0 frames since the non-G0 frame. For example, the pixel history buffer 122 may be [50, 2].

For a subsequent frame, the pixel history 130 includes two previous frames of G0; and if the current frame value 128 is again G0, the output of the remapping function 124 may output the updated pixel history 125 including three frames of G0. As such, the pixel history buffer 122 may be [50, 3]. This may continue as long as the current frame value 128 remains G0 up to some maximum history value of G0. Indeed, the pixel history 130 may track any suitable number of historical G0 frames. However, the full pixel history mode may also be used when the pixel history includes one or more frames of low gray levels followed by a transition to a higher gray level, or vice versa. As described with respect to FIG. 12, it may be beneficial to track the full pixel history, including previous gray levels and a number of frames of G0 to reach the desired luminance at the initial response.

When the current frame value 128 then switches to a non-zero gray level value, the remapping function 124 may output an updated pixel history 125 having an SFR value utilizing the SFR mode. In an example, the SFR value may be used by the overdrive LUT 126 to appropriately compensate for pixel history for a second frame after multiple frames of G0 and a non-G0 frame. In another example, the SFR value may be used by the overdrive LUT 126 to compensate for a second frame following any Gx transition, such as consecutive bright frames (e.g., frames where a display pixel 54 is at a maximum brightness), or consecutive low light frames (e.g., frames where the display pixel 54 is at a low gray level). When the pixel history 130 is in the range of the SFR mode 172, the remapping function 124 may output the updated pixel history 125 as equal to the current frame value 128. Thus, for the next frame, the pixel history 130 will fall in the range of the single frame tracking mode 170. Additionally or alternatively, the SFR mode may be used following any gray level transition. For example, the SFR value may be used by the overdrive LUT 126 to appropriately compensate for pixel history with low gray values and a second frame with a high gray value. Furthermore, the SFR mode may be extended to compensate for any suitable number of subsequent frame responses, such as a third frame response, a fourth frame response, a fifth frame response, and so on.

At block 156, the updated pixel history 125 may be stored in the pixel history buffer 122. At block 158, the overdrive lookup table (LUT) 126 may receive the current frame value 128 and the pixel history 130, which is the updated pixel history 125 from the prior frame stored in the pixel history buffer 122, to determine the compensated value 132. The overdrive LUT 126 may determine the compensated value 132 so that, when the display pixel may be driven using the compensated value 132, the display pixel 54 emits an amount of light corresponding to the current frame value 128. The current frame value 128 may correspond to the target luminance of the display pixel 54.

At block 160, the overdrive table (LUT) 126 may determine the compensated value 132 that causes the display pixel 54 to display image content that may be desired by the current frame value 128, but taking into consideration the hysteresis of the display pixel 54. The overdrive LUT 126 may use the current frame value 128 and the pixel history 130 to determine the overdrive value 132. By way of example, overdrive LUT 126 may include 256 indices, 512 indices, 1024 indices, 2048 indices, 4096 indices, or any suitable number of indices for determining the overdrive value 132.

The singe frame tracking mode may be utilized when the prior pixel history 130 is in the same range as the current frame value 128. The overdrive LUT 126 may output a compensated value 132 to account for significant changes from frame to frame that could result in pixel hysteresis in the single frame tracking mode. In certain instances, the prior pixel history 130 may not be in the same range as the current frame value 128. For example, the prior pixel history 130 may indicate multiple frames of higher gray level values, the overdrive LUT 126 may output a compensated value 132 to account for the higher gray level values. In another example, when the prior pixel history 130 indicates multiple frames of G0 history, the overdrive LUT 126 may output a compensated value 132 to account for the many prior frames of G0 in the full pixel history tracking mode. When the prior pixel history 130 includes a value of 0, this means that there has been one prior frame of G0. As such, the overdrive LUT 126 may output a compensated value 132 to account for the single historical frame of G0. When the pixel history 130 is an SFR value, the overdrive LUT 126 may output a compensated value 132 to account for a second frame response. When the pixel history 130 indicates multiple frames of G0 history, the overdrive LUT 126 may output a compensated value 132 to account for the specific number of prior frames of G0 in the full pixel history tracking mode.

Indeed, the pixel history may include any suitable number of frames (e.g., first frame value, third frame value, fifth frame value, tenth frame value, and so on) and the overdrive system 120 may use the pixel history to determine the compensated value. Furthermore, the overdrive system 120 may apply compensation to not only the first frame response and the second frame response, but also to a third frame response, a fourth frame response, a fifth frame response, and so on. The overdrive system 120 may be calibrated to a display panel (e.g., display panel physics) to determine the appropriate amount of overdrive or underdrive applied to the display pixels 54 to reach the target luminance at the initial optical response.

Consider a particular example in which the pixel history 130 has an encoded value corresponding to five frames of G0, meaning that the display pixel 54 may be been programmed with gray level G0 for the five prior consecutive frames. For a first frame after the five consecutive frames of G0, the current frame value 128 may be a value of 240 (which may have been bit-shifted from an original value of 480). The overdrive LUT 126 may output a compensated value 132 of 320 (e.g., which may be bit-shifted back to an original range for a value of 640) to account for the pixel hysteresis after the five consecutive frames of G0. At the same time, the remapping function 124 may output the updated pixel history 125 to be an encoded value for SFR compensation corresponding to five frames of G0 followed by the current frame value 128. For a second frame response after the five consecutive frames of G0 and the previous current frame value of 124, the new current frame value may happen to be 240 again. The pixel history 130 is now the SFR mapping. Based on the current frame value 128 (e.g., value of 240) and the pixel history 130, the overdrive LUT 126 may output a compensated value 132 of 261 (e.g., which may be bit-shifted back to an original range for a value of 522) to provide an appropriate second frame response to overcome lingering pixel hysteresis that remained after the first frame response.

At block 162, the compensated value 132 may be programmed into the display pixel 54, thereby driving the pixel to reach the target luminance. While the remapping function 124 and the overdrive LUT 126 have been described as accounting for the pixel history (e.g., gray level values Gx, Gy, Gz), the remapping function 124 and the overdrive LUT 126 may additionally or alternatively track a refresh rate, a temperature, or a global display brightness value. Moreover, in some embodiments, when the current frame value 128 differs from the pixel history 130 by some threshold amount, the remapping function 124 may output an updated pixel history as an SFR value. This may ensure that the additional prior frame of pixel history is accounted for in a subsequent frame.

In sum, the specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Moreover, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:

an electronic display comprising a plurality of display pixels; and processing circuitry configured to generate image data for the plurality of display pixels, wherein the processing circuitry is configured to:

receive a current frame value of the image data targeted for a first display pixel of the plurality of display pixels; and based on the current frame value and a pixel history of the first display pixel indicating a plurality of previous frames, determine a modified pixel value with a remapping function, and generate a compensated value used to drive the first display pixel to overcome pixel hysteresis due to the first display pixel being previously driven for the plurality of previous frames.

2. The electronic device of claim 1, wherein the pixel history of the first display pixel indicating the plurality of previous frames indicates a number of most recent consecutive frames where the current frame value was 0.

3. The electronic device of claim 2, wherein the processing circuitry is configured to track pixel histories for each of the plurality of display pixels, wherein the pixel histories indicate whether each of the plurality of display pixels had a plurality of frames where the current frame value was 0.

4. The electronic device of claim 1, wherein the processing circuitry is configured to track pixel histories for each of the plurality of display pixels, wherein the pixel histories indicate whether each of the plurality of display pixels had a plurality of frames where the current frame value was a maximum brightness level.

5. The electronic device of claim 1, wherein the processing circuitry comprises a pixel history buffer that encodes the pixel history of the first display pixel indicating the plurality of previous frames based on a prior pixel history and a prior current frame value.

6. The electronic device of claim 5, wherein the pixel history buffer comprises a single frame buffer.

7. The electronic device of claim 5, wherein the processing circuitry is configured to store the modified pixel value in the pixel history buffer.

8. The electronic device of claim 1, wherein the processing circuitry is configured to bit-shift the current frame value from an original bit depth to a reduced bit depth and bit-shift the compensated value from the reduced bit depth to the original bit depth.

9. The electronic device of claim 1, wherein the processing circuitry comprises:

a memory buffer configured to store the pixel history; and an overdrive lookup table configured to, when executed by the processing circuitry, cause the processing circuitry to index the pixel history and the current frame value and output the compensated value.

10. Image processing circuitry comprising:

a memory buffer configured to store a pixel history that indicates a number of previous frames that a first display pixel of an electronic display displayed a current frame value; and an overdrive lookup table configured to, when executed by the image processing circuitry, cause the image processing circuitry to index the pixel history and the current frame value targeted for the first display pixel and output a compensated value to use to drive the first display pixel to overcome pixel hysteresis due to the pixel history of the first display pixel.

11. The image processing circuitry of claim 10, wherein the memory buffer comprises a single frame buffer that stores the pixel history along with pixel histories of a plurality of other display pixels of the electronic display.

12. The image processing circuitry of claim 11, wherein the memory buffer has a bit depth equal to or lower than that of the current frame value.

13. The image processing circuitry of claim 10, wherein the pixel history indicates a plurality of consecutive previous frames where the current frame value was 0.

14. The image processing circuitry of claim 10, wherein the pixel history indicates a frame value of each frame of a plurality of consecutive previous frames.

15. The image processing circuitry of claim 10, wherein the pixel history is configured to cause the image processing circuitry, when executing the overdrive lookup table to provide additional compensation for a plurality of frame responses after a first frame response.

16. The image processing circuitry of claim 10, comprising remapping function circuitry configured to index the pixel history and the current frame value targeted for the first display pixel and output an updated pixel history to be stored in the memory buffer for a subsequent frame.

17. The image processing circuitry of claim 16, wherein the remapping function circuitry is configured to apply bit-shifting to determine the updated pixel history.

18. The image processing circuitry of claim 17, wherein the remapping function circuitry is configured to output the updated pixel history as a value that indexes a region corresponding to tracking a number of most recent consecutive previous frames where the current frame value was 0 when the indication of the pixel history corresponds to one previous frame where the current frame value was 0 and the current frame value is also 0.

19. One or more tangible, non-transitory, machine-readable media comprising instructions that, when executed by one or more processors, cause the one or more processors to control operations comprising:

receiving a current frame value targeted for a first display pixel of a plurality of display pixels of an electronic display and a previous modified pixel value that encodes a multi-frame history of the first display pixel; and determining an overdrive value to use to drive the first display pixel based on the current frame value and the previous modified pixel value.

20. The one or more tangible, non-transitory, machine-readable media of claim 19, wherein the instructions, when executed by the one or more processors, cause the one or more processors to control operations comprising:

determining a current modified pixel value based on the current frame value and the previous modified pixel value; and storing the current modified pixel value in a memory buffer for use for a subsequent frame.

21. The one or more tangible, non-transitory, machine-readable media of claim 20, wherein the current modified pixel value is determined using a remapping function and the overdrive value is determined using an overdrive table.

22. The one or more tangible, non-transitory, machine-readable media of claim 19, wherein the previous modified pixel value comprises a first set of possible values that indicates an immediately recent current frame value and a second set of possible values that indicate a number of previous frames that the current frame value was 0.

* * * * *